United States Patent
Zak et al.

(10) Patent No.: US 11,975,582 B2
(45) Date of Patent: May 7, 2024

(54) AIR SPRING SYSTEM AND CONTROL

(71) Applicant: WABCO Europe BVBA, Brussels (BE)

(72) Inventors: Przemyslaw Zak, Wroclaw (PL); Stefan Filter, Hannover (DE); Ingo Jovers, Gehrden (DE); Johann Lucas, Sehnde (DE); Nosrat Moradi Dehdezi, Hannover (DE); Andreas Thimm, Sarstedt (DE)

(73) Assignee: ZF CV Systems Europe BV, Brussels (BE)

(*) Notice: Subject to any disclaimer, the term of this patent is extended or adjusted under 35 U.S.C. 154(b) by 792 days.

(21) Appl. No.: 17/052,862

(22) PCT Filed: May 3, 2019

(86) PCT No.: PCT/EP2019/061423
§ 371 (c)(1),
(2) Date: Nov. 4, 2020

(87) PCT Pub. No.: WO2019/215046
PCT Pub. Date: Nov. 14, 2019

(65) Prior Publication Data
US 2021/0245567 A1    Aug. 12, 2021

(30) Foreign Application Priority Data
May 8, 2018    (DE) ..................... 10 2018 111 003.0

(51) Int. Cl.
*B60G 17/015* (2006.01)
*B60G 17/0165* (2006.01)
*B60G 17/052* (2006.01)

(52) U.S. Cl.
CPC ..... *B60G 17/0155* (2013.01); *B60G 17/0165* (2013.01); *B60G 17/0523* (2013.01);
(Continued)

(58) Field of Classification Search
CPC ............ B60G 17/0155; B60G 17/0165; B60G 17/052; B60G 17/0523; B60G 2202/152;
(Continued)

(56) References Cited

U.S. PATENT DOCUMENTS 6,029,764 A * 2/2000 Schubert ............. F16F 15/0275
296/190.07
6,206,481 B1 * 3/2001 Kaisers ................. B60T 15/027
303/118.1

(Continued)

FOREIGN PATENT DOCUMENTS

CN    101166650 A    4/2008
CN    104039570 A    9/2014
(Continued)

OTHER PUBLICATIONS

European Patent Office, Rijswijk, Netherlands, International Search Report of International Application No. PCT/EP2019/061423, dated Sep. 18, 2019, 3 pages.

*Primary Examiner* — Babar Sarwar
(74) *Attorney, Agent, or Firm* — Dickinson Wright PLLC

(57) ABSTRACT

An air suspension control system (ECAS, electronic controlled air suspension) (10) for a utility vehicle, such as a truck or the like, or for a passenger car, includes a main control unit (12) for operating the air suspension control system (10) and at least two auxiliary control units (14) connected to the main control unit (12) via a data link (16). The auxiliary control units (14) each have at least one output (18) for actuating at least one actuator (20) which can be connected to the output (18), in particular an adjustment drive (28) for a valve (30). Furthermore, at least one function for generating control signals at the output (18) can be stored in the auxiliary control units (14), and the main control unit (12) is adapted to call up and/or to parameterize at least the stored functions by transmitting commands via the data link (16).

20 Claims, 1 Drawing Sheet

(52) U.S. Cl.
CPC .... *B60G 2202/152* (2013.01); *B60G 2204/62* (2013.01); *B60G 2400/252* (2013.01); *B60G 2400/51222* (2013.01); *B60G 2500/201* (2013.01); *B60G 2500/204* (2013.01); *B60G 2500/30* (2013.01); *B60G 2600/182* (2013.01); *B60G 2600/71* (2013.01); *B60G 2800/162* (2013.01); *B60G 2800/91* (2013.01); *B60G 2800/914* (2013.01)

(58) Field of Classification Search
CPC .......... B60G 2204/62; B60G 2400/252; B60G 2400/51222; B60G 2500/20; B60G 2500/201; B60G 2500/204; B60G 2500/30; B60G 2600/182; B60G 2600/71; B60G 2800/162; B60G 2800/91; B60G 2800/914; B60G 2800/98
See application file for complete search history.

(56) References Cited

U.S. PATENT DOCUMENTS

| | | | |
|---|---|---|---|
| 11,745,558 B2 * | 9/2023 | Anderson | H02P 21/06 701/37 |
| 2005/0040573 A1 * | 2/2005 | Bolt | B60G 11/27 267/64.28 |
| 2005/0248069 A1 * | 11/2005 | Bolt | B60G 17/0155 280/124.16 |
| 2006/0267297 A1 | 11/2006 | Nordmeyer et al. | |
| 2014/0225345 A1 | 8/2014 | May | |
| 2014/0288776 A1 * | 9/2014 | Anderson | F16F 9/466 701/37 |
| 2015/0224845 A1 * | 8/2015 | Anderson | F03G 7/08 701/37 |
| 2015/0273972 A1 | 10/2015 | Plath | |
| 2017/0211649 A1 | 7/2017 | Leonard et al. | |
| 2017/0246926 A1 * | 8/2017 | Macnamara | B62D 61/12 |
| 2018/0345747 A1 * | 12/2018 | Boon | B60G 17/018 |
| 2019/0337349 A1 * | 11/2019 | Delorenzis | F16F 9/05 |
| 2021/0039469 A1 * | 2/2021 | Vaughan | B60G 17/0525 |

FOREIGN PATENT DOCUMENTS

| | | | |
|---|---|---|---|
| DE | 10245815 A1 * | 4/2004 | .......... B60G 17/015 |
| DE | 10245815 A1 | 4/2004 | |
| DE | 102014101084 A1 | 7/2015 | |
| DE | 112015000259 T5 | 9/2016 | |
| EP | 2765325 A1 | 8/2014 | |
| EP | 3072716 A1 | 9/2016 | |
| WO | 2004030956 A1 | 4/2004 | |
| WO | WO-2015105454 A1 * | 7/2015 | .......... B60G 17/052 |

\* cited by examiner

AIR SPRING SYSTEM AND CONTROL

TECHNICAL FIELD

The invention relates to the field of air suspension systems for utility vehicles or passenger cars. Air suspension systems for vehicles are known which improve ride comfort and safety by the use of air springs. This is achieved, for example, by protecting the structure and occupants of a vehicle by means of the air springs against jolts caused by unevenness of the ground when the vehicle is moving. In addition, vibrations caused by unevenness of the ground when the vehicle is moving can be damped or even prevented.

BACKGROUND

In the field of air suspension systems, a distinction is to be made between adjustable and non-adjustable suspension systems. Adjustable air suspension systems usually have a variable gas mass, preferably air mass, of the air springs, while the gas mass of the air springs in the case of non-adjustable air suspension systems is fixed. Non-adjustable air springs can be used primarily for the above-mentioned purposes, while adjustable air springs permit enhanced functions. Such an enhanced function of an adjustable air suspension system is, for example, level control, in which an adaptation of the ride height of a vehicle, for example in dependence on a vehicle load, is kept constant.

For the achievement of further functions, adjustable or variable air suspension systems have an air suspension control system which varies the gas mass in a spring element in dependence on sensors, for example. Manual intervention with control signals, as is known, for example, in the case of an automatic lowering system in a bus for facilitating the entry and exit of passengers, is also known.

In the present case there is to be considered an adjustable air suspension system in which a variable gas mass is used in air springs, in particular for the suspension of a vehicle.

As already mentioned above, such air suspension systems generally have an air suspension control system which is connected to a plurality of sensors and actuators for controlling the gas mass of the air springs. Accordingly, a plurality of measured values is supplied to an air suspension control system, which is usually part of a control device including further functions. The control device must additionally transmit a plurality of commands in order to actuate the actuators. In addition, the control device must have a quick reaction time in order to generate corresponding control signals from the plurality of measured values.

A control device which the air suspension control system comprises is therefore subject to a highly complex development effort and requires a very high computing capacity. In particular, the entire air suspension system is shut down in the event of failure of the control device.

SUMMARY

Accordingly, it is desirable to find an air suspension system or an air suspension control system, which is less complex and, for example, can be adapted to different vehicles or vehicle types in a simple manner. In any case, an air suspension system or air suspension control system that is advantageous compared to the prior art is to be found.

To that end, the present disclosure relates to an air suspension control system for a utility vehicle or a passenger car. The air suspension control system can also be called an electronic controlled air suspension (ECAS). A utility vehicle is, for example, a bus or a truck but also includes a truck-trailer combination.

The air suspension control system according to the invention has a main control unit for operating the air suspension control system. In addition, the air suspension control system comprises at least two auxiliary control units. The auxiliary control units are each connected to the main control unit via a data link. The data link is either a shared data link or a separate data link. This means that, in the case of a shared data link, the main control unit and both auxiliary control units are connected to a shared data line, for example comprising two or more electrical conductors. If the data link is in the form of a separate data link, this means that a separate data line is provided between the main control unit and each of the at least two auxiliary control units.

Each of the auxiliary control units has at least one output. The output serves to actuate at least one actuator which can be connected to the output. An actuator is, for example, an adjustment drive for a valve. Preferably, the actuator is an electromagnetic valve component, which is, for example, a pneumatic or hydraulic valve component. The valve is particularly preferably a solenoid valve.

At least one function for generating control signals at the output can be stored in each of the auxiliary control units. This means that the auxiliary control unit is preferably adapted to actuate an output in dependence on a stored function which is stored in the auxiliary control unit.

The main control unit is additionally adapted to call up and/or parameterize the stored function. This is effected by the transmission of commands via the data link from the main control unit to the auxiliary control unit whose function is to be called up and/or parameterized.

Calling up is here to be understood in particular as meaning that, by calling up a function, the auxiliary control unit is put into operation with that function, and control signals are thereupon generated at the output of the auxiliary control unit in dependence on the called-up function.

The term function is here not limited to a mathematical function in the sense of the representation of a relationship between two quantities. Instead, in the present case, the term function is also to be understood in its meaning as used in computer science. Accordingly, a function is a program construct which without input values, or preferably with input values, for example comprising input data and/or sensor data and/or a parameterization, generates output values.

Compared to conventional air suspension control systems which have only a single control unit with which all the actuators are actuated via the outputs thereof, the control unit according to the invention is accordingly of modular construction. The main control unit of the present invention serves substantially only to call up and/or parameterize the functions stored in the auxiliary control units.

A stored function can be, for example, a level control function. Accordingly, the level control function is called up by the main control unit in the auxiliary control units as required. The parameter specified by the main control unit to the auxiliary control units can be, for example, a desired ride height that is to be kept constant. When the level control function is called up, valves in each of the auxiliary control units are then so actuated that gas masses are guided into or out of the air springs in such a manner as to keep the specified ride height substantially constant.

If—staying with the above example of the level control function—level control of one or more air springs is to be carried out by all the auxiliary control units, then the main control unit can, for example, call up the corresponding function or level control function in a single call to all the auxiliary control units. After calling up the level control function, the main control unit no longer has to interact for this purpose.

A modular construction of the air suspension control system is thereby possible so that, for example, the same main control unit can always be used in the vehicle irrespective of the number of necessary auxiliary control units. In addition, data traffic on the data link(s) can be greatly reduced or even avoided completely once a function has been called up. The bandwidth of a data link can accordingly be used for other communications.

In addition, a lower computing capacity of the main control unit is also necessary, since a relocation of the functions into the auxiliary control units takes place. A main control unit, with the same computing capacity, can accordingly perform other functions and can be limited, in terms of an air suspension, substantially to superordinate monitoring functions of the air suspension without having to carry out a time-critical control of the air suspension.

According to a first embodiment, the auxiliary control units each have at least one input for acquiring sensor data. At least one sensor can be connected to the input. In addition, the auxiliary control units are each adapted to generate control signals at the output in dependence on the sensor signals. Preferably, the auxiliary control unit is adapted to generate control signals at the output, accordingly in dependence on the sensor signals and a function, in particular a stored, called up function. Particularly preferably, values of sensor data or values derived therefrom are accordingly so linked with a function that is performed in the auxiliary control unit that specific control signals are generated at the output.

In the exemplary case of the above-mentioned level control function, a current state of the prevailing ride height, for example, is supplied to the auxiliary control unit as sensor data, so that an actuator for changing the ride height or for maintaining the ride height can correspondingly be actuated at the output. Complete control of a single closed system is accordingly possible with an auxiliary control unit when, for example, sensor data are considered as the actual value, the function has target value specifications and control takes place via the output by actuation of one or more actuators.

Individual, self-contained control systems comprising an auxiliary control unit can accordingly carry out control in an autonomous manner, separately and independently of the main control unit, once they have been activated by the calling up of a function by the main control unit. The above-mentioned parameterization of the function can represent, for example, a target value specification for the function.

According to a further embodiment, the auxiliary control unit is adapted to acquire at the input signals of at least one sensor, which comprises a distance, height and/or pressure sensor. In particular for adjusting an actuator for varying or keeping constant a ride height by means of an auxiliary control unit, complete controllability by the auxiliary control unit without further instructions by a main control unit is possible by acquiring distances, for example, between axles and wheel housings or between the distance of the floor of the vehicle from the ground and/or by recording pressure measurements with a pressure sensor in order to evaluate a loading situation.

According to a further embodiment, the auxiliary control unit is also adapted to transmit sensor signals to the main control unit via the data link. This is preferably the case when a command, for example that a sensor signal is to be read, is transmitted by the main control unit via the data link and that command is received by the auxiliary control unit. Preferably, the main control unit can accordingly be used as a monitoring body, for example for a correct function, even though control using sensors and actuators is itself carried out within the auxiliary control unit. The main control unit is, for example, so configured that, at intervals or when triggered by a request from a further superordinate body, it checks, on the basis of sensor signals or other data of an auxiliary control unit, that the auxiliary control unit is functioning correctly and/or without error.

According to a further embodiment, the auxiliary control units are each adapted to receive and interpret at least one predefined fixed set of commands from the main control unit. Accordingly, the main control unit is configured, for example, with a fixed set of commands, wherein the interpretation of a command takes place in dependence on the configuration of a function stored in the auxiliary control unit.

An individual adaptation of the air suspension control system can accordingly take place solely by adaptation of the auxiliary control units. Thus, the main control unit can always be identical, irrespective of the individual construction of a vehicle or the requirements of the vehicle in which an air suspension control system is to be used. The same main control unit can accordingly be used, for example, for a plurality of different individual vehicles, so that it is possible to produce the main control unit less expensively because of the large quantities that are required.

According to a further embodiment, the data link is a bus. In particular, the bus is a CAN bus. A data link in the form of a bus, in particular a CAN bus, is particularly advantageous for connecting the main control unit to the auxiliary control units since it is already planned or present in today's vehicles. Accordingly, a main control unit can be arranged, for example, in the region of the vehicle in which further superordinate control units are present, while the auxiliary control units can be arranged, for example, in the region close to one or more actuators that are to be controlled. A bus that is already present can then be used to achieve communication between the auxiliary control units and the main control unit without additional cable connections having to be provided.

The invention relates additionally to an air suspension system which preferably comprises an air suspension control system according to one of the above-mentioned embodiments. The air suspension system comprises an actuator for connection to an air suspension control system. The actuator is a valve drive and is adapted to actuate, in a continuous manner or with more than three steps, the flow through the valve opening, connected to the valve drive for actuation, of a valve.

It is thereby possible, for example, to adjust the speed with which the ride height is varied. For example, the ride height can accordingly be changed at a lower speed when the vehicle is moving than when it is at a standstill in order, for example, not to exert an abrupt influence on the driving dynamics while the vehicle is moving.

In particular in the case of buses, this has the advantage that the ride height can be adjusted particularly quickly when the bus is stopped for the entry and exit of passengers. This is preferably possible by means of the same valve which assists with level control while the vehicle is moving, without multiple valves connected in parallel being necessary.

According to one embodiment, the valve drive has a stepper motor. A stepper motor is adjustable in a simple manner in a plurality of steps, so that, depending on the step size of the stepper motor used, a plurality of steps is possible for actuating the valve. According to one embodiment, the actuator of the air suspension system is configured to be connected to an output of an auxiliary control unit.

The invention relates additionally to a vehicle which in particular is a utility vehicle or a passenger car and comprises an air suspension control system according to one of the above-mentioned embodiments and/or an air suspension system according to one of the above-mentioned embodiments.

According to one embodiment, the vehicle has multiple axles, wherein the air suspension control system comprises an auxiliary control unit for each axle. An individual construction of the air suspension control system in dependence on the number of axles is accordingly made possible.

The invention relates additionally to a method for operating a vehicle having an air suspension control system according to one of the above-mentioned embodiments and/or an air suspension system according to one of the above-mentioned embodiments.

According to one embodiment of the method, for operation, control signals are generated at the output of at least one auxiliary control unit in dependence on functions which are stored in the auxiliary control unit and in dependence on commands which are sent by a main control unit to the auxiliary control unit. Preferably, the control signals are additionally generated in dependence on sensor signals of at least one sensor connected to the auxiliary control unit.

Further embodiments will become apparent from the exemplary embodiments described in greater detail in the drawings.

DETAILED DESCRIPTION OF THE DRAWINGS

Figure 1:
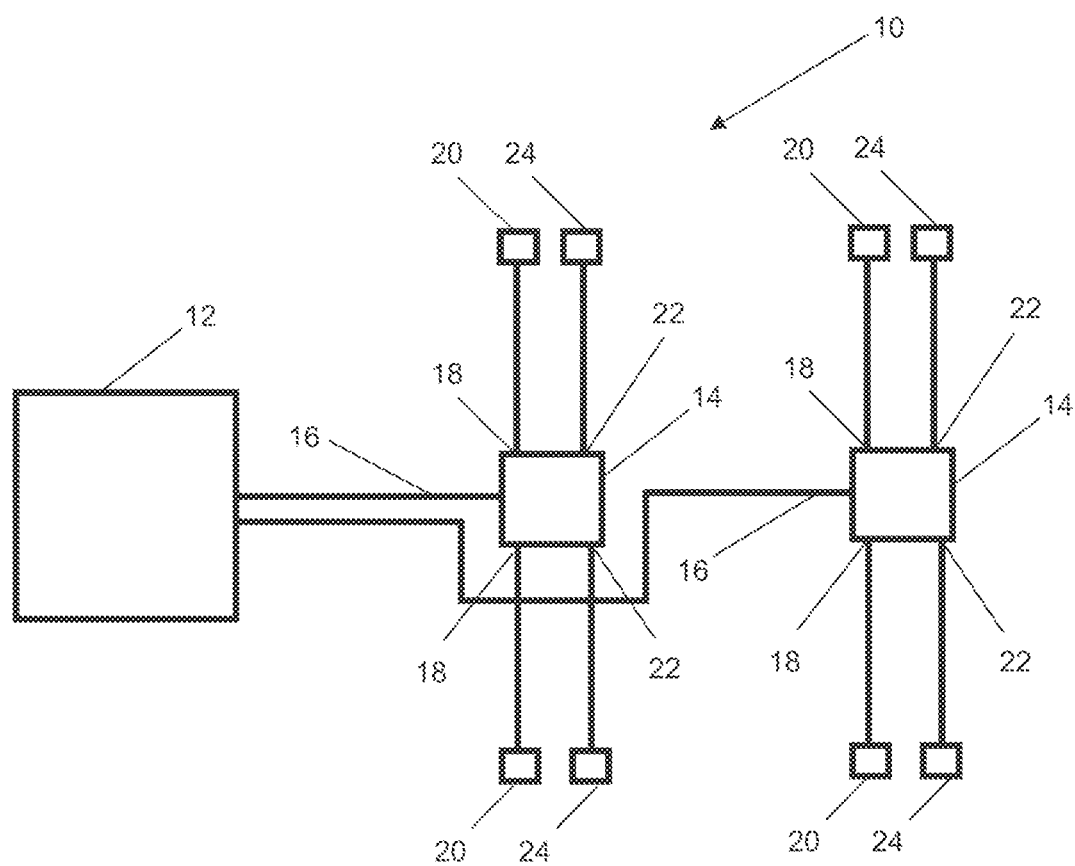
FIG. 1 shows an air suspension control system.

FIG. 1 shows an air suspension control system 10 according to one of the above-mentioned embodiments. The air suspension control system 10 comprises a main control unit 12 and two auxiliary control units 14. The auxiliary control units 14 are each connected to the main control unit 12 via a data link 16. Accordingly, the data link 16 serves to transmit data from the main control unit 12 to the auxiliary control units 14 and from the auxiliary control units 14 to the main control unit 12.

In FIG. 1, the data link 16 is represented by two individual lines which, for example, each comprise multiple electrical or optical lines. According to another exemplary embodiment of the invention which is not shown here, these two lines are not separate and there is a shared data link between the main control unit 12 and the two auxiliary control units 14. This shared data link is preferably a bus system.

Each of the auxiliary control units 14 has two outputs 18, with each of which an actuator 20 is electrically connected. Each of the auxiliary control units additionally comprises two inputs 22, with each of which a sensor 24 is connected.

The air suspension control system is so configured that functions in the auxiliary control units 18 are first called up via the main control unit 12 by means of the data link 16 and are parameterized. On the basis of those functions, output signals are then generated at the outputs 18 for the actuators 20 in dependence on the function and also on sensor data that are provided via the sensors 24 to the inputs 22 of the auxiliary control units 14. Functions are, for example, the raising or lowering of a vehicle with the air suspension control system or the inclining of the vehicle or level control on or after loading of a vehicle.

Figure 2:
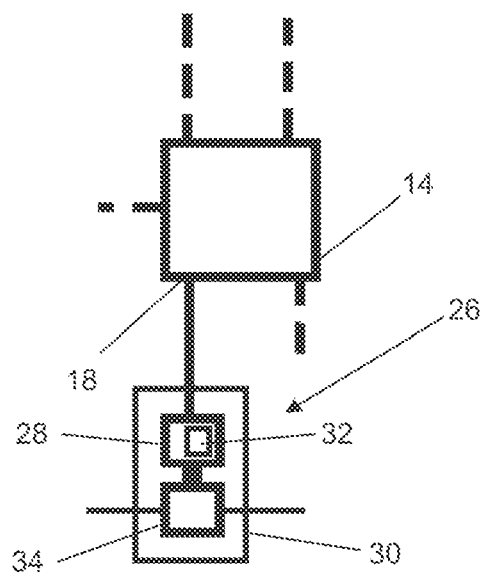
FIG. 2 shows an air suspension system according to an exemplary embodiment.

FIG. 2 shows an air suspension system 26 which is controllable by means of the air suspension control system 10. The air suspension system has an actuator 20, which is in the form of a valve drive 28. The valve drive 28 is accordingly connected to an output 18 of the auxiliary control unit 14. The valve drive 28 is part of a valve 30 and has a stepper motor 32 for actuating a valve opening 34 of the valve 30 in a continuous manner or with more than three steps.

The valve 30 is accordingly so actuated by the auxiliary control unit 14 that there is provided for the valve drive 28 a step of the valve opening 34 that is desired. The valve drive 28 then adjusts the valve opening 34 according to the desired step by means of the stepper motor 32. The flow through the valve 30 is thereby so varied that, for example, slow or rapid raising of a vehicle is made possible by filling a cylinder with gas, in particular air, according to the flow.

What is claimed is:

1. An air suspension control system (ECAS, electronic controlled air suspension) (10) for a vehicle, the air suspension control system comprising:
   a main control unit (12) having a processor, and memory that operates the air suspension control system (10),
   at least two auxiliary control units (14), each of which is connected to the main control unit (12) via a separate or a shared data link (16) and which receive commands from the main control unit (12),
   wherein each of the at least two auxiliary control units (14) has an output (18) wherein the output actuates an actuator (20) connected to the output (18),
   wherein each of the at least two auxiliary control units (14) has a stored function that generates control signals at the output (18) of each of the at least two auxiliary control units (14), wherein the control signals control and actuate the actuator (20) via the output and
   wherein the main control unit (12) calls up the stored function of each of the at least two auxiliary control units (14) by transmitting the commands to each of the at least two auxiliary control units (14) via the data link (16), wherein each of the at least two auxiliary control units (14) perform the stored function and generate the control signals.

2. The air suspension control system (10) as claimed in claim 1, wherein each of the at least two auxiliary control units (14) has an input (22) that acquires sensor data from a sensor (24) connected to the input (22), and each of the at least two auxiliary control units (14) generates control signals at the output (18) in dependence on the sensor signals that are acquired at the input.

3. The air suspension control system (10) as claimed in claim 2, wherein the sensor (24) is one of a distance sensor, a height sensor, and a pressure sensor.

4. The air suspension control system (10) as claimed in claim 2, wherein each of the at least two auxiliary control units (14) transmits is adapted to transmit sensor signals to the main control unit (12), in particular following receipt of a command sent by the main control unit (12) and received at each of the at least two auxiliary control units (14) via the data link (16).

5. The air suspension control system (10) as claimed in claim 4, wherein each of the at least two auxiliary control units (14) receives and interprets at least one predefined fixed set of commands from the main control unit (12).

6. The air suspension control system (10) as claimed in claim 4, wherein the main control unit (12), based on the sensor signals received from a select one of the at least two auxiliary control units, performs a check that each of the at least two auxiliary control units (14) is functioning correctly and/or error free.

7. The air suspension control system (10) as claimed in claim 6, wherein the control unit (12) performs the check at intervals or when triggered by a superordinate body.

8. The air suspension control system (10) as claimed in claim 6, wherein the main control unit transmits a command to each of the at least two auxiliary control units, which command is received at each of the at least two auxiliary control units, that the sensor signal is to be read, and the sensor signals are transmitted to the main control unit via the data link in response thereto.

9. The air suspension control system (10) as claimed in claim 1, wherein each of the at least two auxiliary control units (14) stores a predefined fixed set of functions.

10. The air suspension control system (10) as claimed in claim 1, wherein the data link (16) is a CAN bus.

11. An air suspension system (26) comprising:
the air suspension control system (10) of claim 1,
an actuator (20) connected to the air suspension control system (10), wherein the actuator (20) is a valve drive (28), wherein the valve drive (28) actuates, continuously or in more than three steps, a flow through a valve opening (34) of a valve (30) connected to the valve drive.

12. The air suspension system (26) as claimed in claim 11, wherein the valve drive (28) comprises a stepper motor (32).

13. The air suspension system (26) as claimed in claim 11, wherein the actuator (20) is connected to at least one output (18) of one of the at least two auxiliary control units (14).

14. A vehicle comprising the suspension system (26) as claimed in claim 11.

15. The vehicle as claimed in claim 14, wherein the vehicle has multiple axles and the air suspension system (10) comprises at least one of the at least two auxiliary control units (14) for each axle.

16. The air suspension system as claimed in claim 11, wherein each of the at least two auxiliary control units (14) is disposed in the region of the actuator being controlled by each of the at least two auxiliary control units, and the main control unit (12) is disposed remote relative to the actuator.

17. The air suspension control system (10) as claimed in claim 1, wherein the main control unit (12) commands each of the at least two auxiliary control units (14) to perform an adjustment, wherein each of the at least two auxiliary control units performs the stored function based on the command received from the main control unit and determines and generates the control signal that commands the actuator and adjusts a suspension of the vehicle.

18. A method for operating a vehicle with an air suspension and with an air suspension control system having at least two auxiliary control units, the method comprising the following steps:
sending commands from a main control unit having a processor, and memory to an auxiliary control unit (14) via a data link, wherein the commands cause the auxiliary control unit to generate a control signal at an output (18) thereof; and
generating control signals by the auxiliary control unit at the output (18) of the auxiliary control unit (14);
wherein the control signals are generated in dependence on functions which are stored in the auxiliary control unit (14);
wherein the control signals are generated and in dependence on the commands which are sent by the main control unit (12) to the auxiliary control unit (12);
wherein the control signals from the auxiliary control unit adjust and operate the air suspension of the vehicle.

19. The method of claim 18, further comprising adjusting a ride height of a vehicle having the air suspension at a variable rate depending on an operating state of the vehicle.

20. The method of claim 19, wherein the ride height is adjusted more quickly when the vehicle is stationary and the ride height is adjusted more slowly when the vehicle is in motion.

* * * * *